United States Patent
Mukherjee

(10) Patent No.: US 12,164,613 B2
(45) Date of Patent: Dec. 10, 2024

(54) CREATING FEATURE BASED IMAGE RECOGNITION SUBCLASSES FOR IDENTITY VERIFICATION

(71) Applicant: Bank of America Corporation, Charlotte, NC (US)

(72) Inventor: Maharaj Mukherjee, Poughkeepsie, NY (US)

(73) Assignee: Bank of America Corporation, Charlotte, NC (US)

( * ) Notice: Subject to any disclaimer, the term of this patent is extended or adjusted under 35 U.S.C. 154(b) by 348 days.

(21) Appl. No.: 17/662,695

(22) Filed: May 10, 2022

(65) Prior Publication Data

US 2023/0367854 A1    Nov. 16, 2023

(51) Int. Cl.
*G06F 21/32*    (2013.01)
*G06N 3/08*    (2023.01)
(Continued)

(52) U.S. Cl.
CPC .............. *G06F 21/32* (2013.01); *G06N 3/08* (2013.01); *G06V 10/431* (2022.01);
(Continued)

(58) Field of Classification Search
CPC .. G06F 21/32; G06V 10/7747; G06V 40/197; G06V 10/431; G06V 40/1365;
(Continued)

(56) References Cited

U.S. PATENT DOCUMENTS

| 8,694,459 B2 | 4/2014 | Zadeh |
| 9,063,930 B2 | 6/2015 | Zadeh |

(Continued)

FOREIGN PATENT DOCUMENTS

| CN | 112330322 A | * | 2/2021 | ......... G06F 16/2237 |
| CN | 112801009 A | * | 5/2021 | ......... G06K 9/00228 |
| EP | 3757873 A1 | * | 12/2020 | ......... G06K 9/00221 |

OTHER PUBLICATIONS

Moussa, Mourad & Hamila, Maha & Douik, Ali. (2020). Face recognition using fractional coefficients and discrete cosine transform tool. International Journal of Electrical and Computer Engineering. 11. 892-899. 10.11591/ijece.v11i1.pp892-899. (Year: 2020).*

*Primary Examiner* — Vu Le
*Assistant Examiner* — Jack Peter Kraynak
(74) *Attorney, Agent, or Firm* — Banner & Witcoff, Ltd.

(57) ABSTRACT

Aspects of the disclosure relate to user authentication. A computing platform may receive a plurality of facial scans of an individual. The computing platform may train, using the plurality of facial scans, a convolutional neural network (CNN) to identify the individual, based on a first facial scan of the individual, using subclasses of the CNN. The computing platform may receive an authorization request including the first facial scan of the individual. The computing platform may input the first facial scan into the CNN, which may cause the CNN to identify the individual. Based on successful identification of the individual, the computing platform may grant requested access to the individual. The computing platform may update, using the first facial scan, the CNN.

20 Claims, 7 Drawing Sheets

(51) Int. Cl.
*G06V 10/42* (2022.01)
*G06V 10/764* (2022.01)
*G06V 10/774* (2022.01)
*G06V 10/82* (2022.01)
*G06V 40/12* (2022.01)
*G06V 40/16* (2022.01)
*G06V 40/18* (2022.01)
*G06V 40/20* (2022.01)

(52) U.S. Cl.
CPC .......... *G06V 10/435* (2022.01); *G06V 10/764* (2022.01); *G06V 10/7747* (2022.01); *G06V 10/82* (2022.01); *G06V 40/1365* (2022.01); *G06V 40/172* (2022.01); *G06V 40/197* (2022.01); *G06V 40/25* (2022.01)

(58) Field of Classification Search
CPC .... G06V 40/172; G06V 10/82; G06V 10/435; G06V 10/764; G06V 40/25; G06N 3/08
See application file for complete search history.

(56) References Cited

U.S. PATENT DOCUMENTS

| | | | |
|---|---|---|---|
| 10,311,290 B1 * | 6/2019 | Littwin | G06F 18/22 |
| 10,902,300 B2 * | 1/2021 | Sun | G06N 3/045 |
| 11,228,803 B1 | 1/2022 | Jang | |
| 11,238,618 B2 | 2/2022 | Zhang et al. | |
| 11,256,736 B2 | 2/2022 | Koroa et al. | |
| 11,256,950 B2 | 2/2022 | Yamada et al. | |
| 11,263,482 B2 | 3/2022 | Schwartz et al. | |
| 11,263,753 B2 | 3/2022 | Larlus-Larrondo et al. | |
| 11,263,762 B2 | 3/2022 | Wu et al. | |
| 11,264,125 B2 | 3/2022 | Paz | |
| 11,270,149 B2 | 3/2022 | Wang | |
| 11,270,169 B2 | 3/2022 | Sun et al. | |
| 11,285,273 B2 | 3/2022 | Cowan et al. | |
| 11,301,704 B2 | 4/2022 | Yoo | |
| 11,301,711 B2 * | 4/2022 | Price | G06V 10/764 |
| 11,307,660 B2 | 4/2022 | Yang et al. | |
| 11,308,728 B2 | 4/2022 | Chang et al. | |
| 11,321,383 B2 | 5/2022 | Mitkar et al. | |
| 11,321,961 B2 | 5/2022 | Jang | |
| 2018/0107865 A1 * | 4/2018 | Ahlawat | G06V 40/161 |
| 2020/0151309 A1 * | 5/2020 | Thuillier | G06V 10/82 |
| 2020/0293761 A1 * | 9/2020 | Li | G06V 40/172 |
| 2021/0271742 A1 * | 9/2021 | Eckel | G08B 21/18 |
| 2022/0012858 A1 * | 1/2022 | Pardeshi | G06N 3/045 |
| 2023/0316804 A1 * | 10/2023 | Li | G06V 40/164 |

* cited by examiner

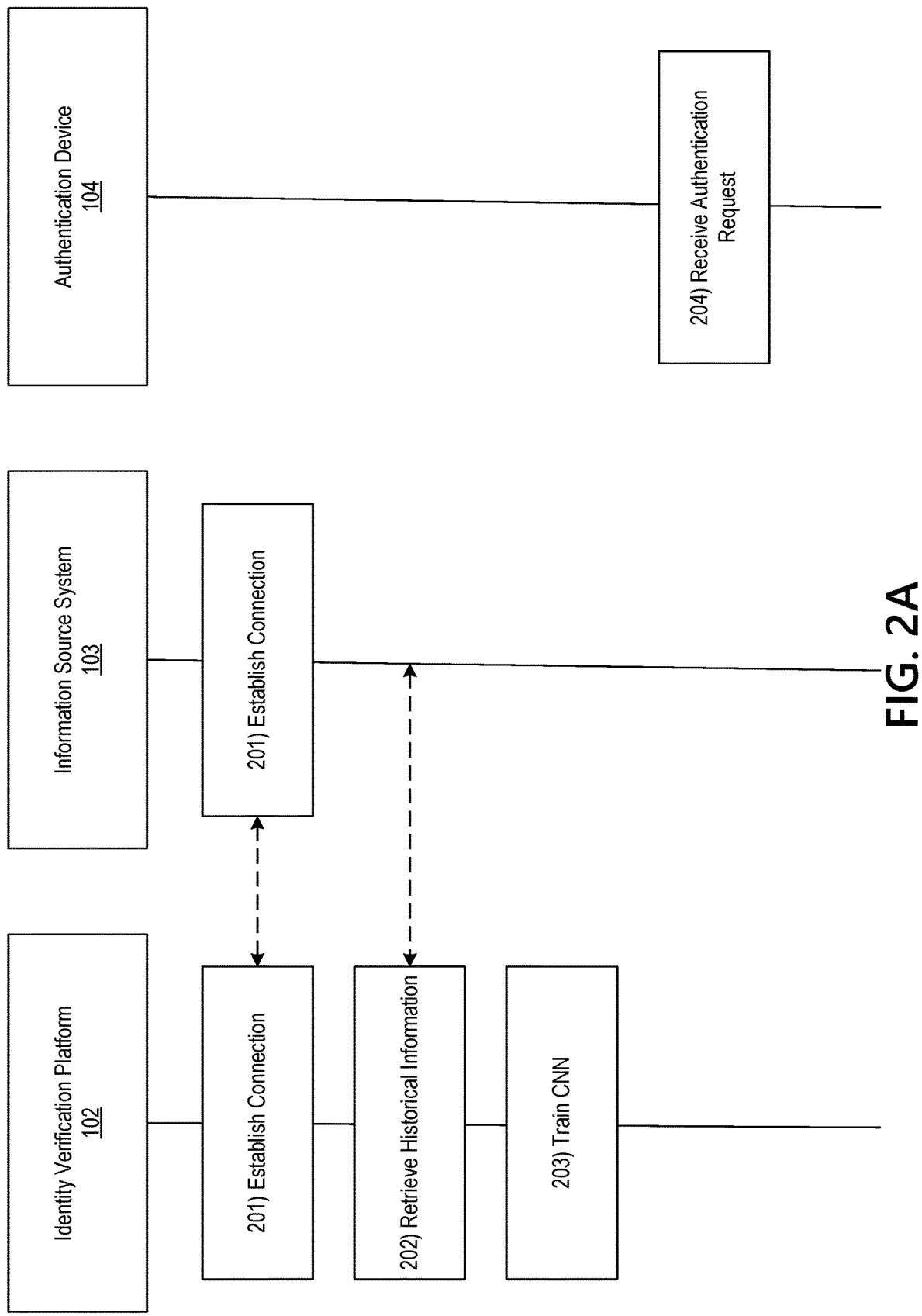

CREATING FEATURE BASED IMAGE RECOGNITION SUBCLASSES FOR IDENTITY VERIFICATION

BACKGROUND

Aspects of the disclosure relate to computer hardware and software for identity verification. In some instances, facial recognition may be used for identity verification, authentication, and/or authorization. In some instances, such facial recognition may be performed using convolutional neural networks (CNNs), which may classify images using the frequency domain rather than the spatial domain (e.g., so as to ignore spatial transformations such as translation, rotation, scaling, or other transformations). In these instances, a single classification class may be used for each individual, and newly received images may be compared to a center of gravity or centroid of the class to determine whether or not the individual may be classified. In some instances, however, physical complexion of the individual may change and/or develop over time (e.g., as a result of aging, physical injury, or otherwise). In these instances, identity verification by the CNN may be error prone, as it may fail to accurately classify newly received images based on these single classes (e.g., because the changing complexion may result in a frequency domain image that significantly deviates from the original center of gravity). As automated identity verification based on facial recognition is increasingly implemented, it may be important to enhance the method by which CNNs perform such analysis.

SUMMARY

Aspects of the disclosure provide effective, efficient, scalable, and convenient technical solutions that address and overcome the technical problems associated with user authentication. In accordance with one or more embodiments of the disclosure, a computing platform comprising at least one processor, a communication interface, and memory storing computer-readable instructions may receive a plurality of facial scans of an individual. The computing platform may train, using the plurality of facial scans, a convolutional neural network (CNN) to identify the individual based on a first facial scan of the individual, which may include: 1) converting the plurality of facial scans to a frequency domain, 2) identifying a center of gravity for each of the plurality of facial scans, and 3) generating, based on distances between the centers of gravity, one or more subclasses for the plurality of facial scans, wherein each subclass is defined by a center of gravity range limited by a minimum center of gravity value and a maximum center of gravity value. The computing platform may receive an authorization request including the first facial scan of the individual. The computing platform may input the first facial scan into the CNN, which may cause the CNN to: 1) convert the first facial scan to the frequency domain, 2) identify a center of gravity for the first facial scan, 3) compare the center of gravity for the first facial scan to center of gravity ranges to identify a corresponding subclass, and 4) identify, based on the corresponding subclass, the individual. Based on successful identification of the individual, the computing platform may grant requested access to the individual. The computing platform may update, using the first facial scan, the CNN.

In one or more instances, the plurality of facial scans may include images of the individual throughout a lifetime of the individual. In one or more instances, training the CNN may be further based on a plurality of fingerprint patterns of the individual, and training the CNN may include: 1) converting the plurality of fingerprint patterns to the frequency domain, 2) identifying a center of gravity for each of the plurality of fingerprint patterns, and 3) generating, based on distances between the centers of gravity of the plurality of fingerprint patterns, one or more subclasses for the plurality of fingerprint patterns.

In one or more examples, the computing platform may receive a first fingerprint pattern. The computing platform may input the first fingerprint pattern into the CNN, which may cause the CNN to: 1) convert the first fingerprint pattern to the frequency domain; 2) identify a center of gravity for the first fingerprint pattern; 3) identify, based on the center of gravity for the first fingerprint pattern, a corresponding fingerprint pattern subclass; and 4) identify, based on the corresponding fingerprint pattern subclass, the individual.

In one or more instances, training the CNN may be further based on a plurality of iris images of the individual, and training the CNN may include: 1) converting the plurality of iris images to the frequency domain, 2) identifying a center of gravity for each of the plurality of iris images, and 3) generating, based on distances between the centers of gravity of the plurality of iris images, one or more subclasses for the plurality of iris images. In one or more instances, the computing platform may receive a first iris image. The computing platform may input the first iris image into the CNN, which may cause the CNN to: 1) convert the first iris image to the frequency domain; 2) identify a center of gravity for the first iris image; 3) identify, based on the center of gravity for the first iris image, a corresponding iris subclass; and 4) identify, based on the corresponding iris subclass, the individual. In one or more examples, training the CNN may be further based on a plurality of gait images of the individual, and training the CNN may include: 1) converting the plurality of gait images to the frequency domain, 2) identify a center of gravity for each of the plurality of gait images, and 3) generate, based on distances between the centers of gravity of the plurality of gait images, one or more subclasses for the plurality of gait images. In one or more examples, the computing platform may receive a first gait image. The computing platform may input the first gait image into the CNN, which may cause the CNN to: 1) convert the first gait image to the frequency domain, 2) identify a center of gravity for the first gait image, 3) identify, based on the center of gravity for the first gait image, a corresponding gait subclass, and 4) identify, based on the corresponding gait subclass, the individual.

In one or more examples, the computing platform may identify the individual based on analysis of additional biometric information using the CNN. In one or more examples, the computing platform may update the CNN by adding a new subclass based on the center of gravity for the first facial scan, and/or merging the subclasses based on the center of gravity for the first facial scan.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which:

FIGS. 2A-2C depict an illustrative event sequence for performing enhanced identity verification in accordance with one or more example embodiments;

DETAILED DESCRIPTION

Figure 1A:
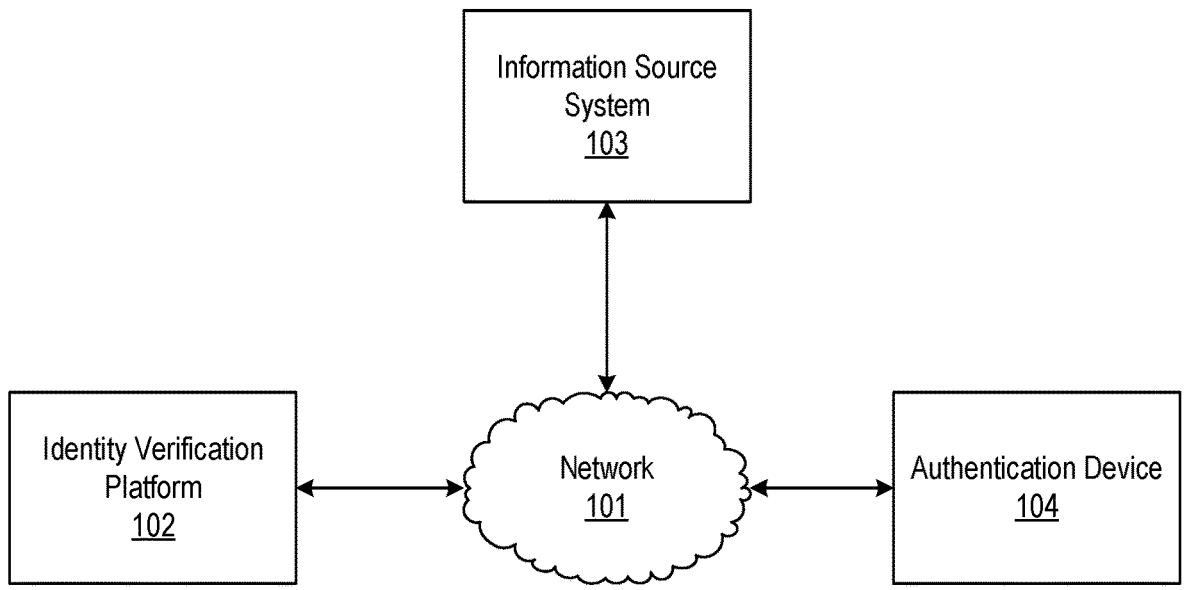
FIGS. 1A and 1B depict an illustrative computing architecture for performing enhanced identity verification in accordance with one or more example embodiments.

In the following description of various illustrative embodiments, reference is made to the accompanying drawings, which form a part hereof, and in which is shown, by way of illustration, various embodiments in which aspects of the disclosure may be practiced. In some instances, other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

As a brief introduction of the concepts described in further detail below, image recognition may be an important aspect of biometric identity establishment, verification, and/or authentication. Examples of such image based identity management systems may include signature verification, face recognition, iris scanning, fingerprint identification, gait identification, and/or other systems.

However, these images often naturally change as people change physically. For example, people's faces may change over time. Similarly, people's gait may change over time or as they gain weight. The iris scan image may also change as people develop cataract or other eye issues. People's signatures may also change with time because the way they move their fingers may change.

In some instances, these changes may happen abruptly when there is an accident or something similar inducing physical and/or biometric changes. Customers may be inconvenienced or confused if biometric authentication does not work or fails because of the changes.

Accordingly, described herein is a method that ensures people are not inconvenienced because of these slow changes related to physical changes. Current authentication systems might not be able to identify an individual based on images that were taken at different times without someone specifically labeling them as belonging to the same person.

Machine learning methods such as CNN may be implemented for image recognition. CNN is a deep learning neural network, meaning that it may use one or more hidden layers in the classification method. In CNN, a first image may be first transformed by a convolutional from a spatial domain to a frequency domain. The advantage of classification in the frequency domain is that it is independent of spatial transformations such as translation, rotation, scaling, and/or other transformations.

If the image has more than two dimensions, such as a video image that has three spatial dimensions and time dimensions, a three dimension convolution may be used instead that involves both spatial and time domain frequencies. Video images may be used for, for example, gait identification for authentication.

Once images are convoluted, they may be classified based on their frequency content in different classes. These classifications may be performed in a hybrid method that uses supervised and unsupervised classification.

Currently, a single classification class may be used for each person. These classes may use a centroid mechanism for each class and a distance from the centroid may be used to determine which image belongs to a class and which does not. However, images of a single individual may be classified into multiple groups. For example, even if the person is registered in a single image, an image of the person when younger with a first set of facial features might not have some of the frequencies close to the centroid, and an image of the person when older that may have a second, different set of facial features leading to many higher frequency components.

Accordingly, rather than building a large class with a single centroid, several subclasses may be used, each with a different centroid. The subclasses may also partially overlap. However, the membership to each subclass may be determined by relative distances from each of the centroids.

As a particular example, a class for "Person #1" may contain three sub-classes (e.g., Person #1-1, Person #1-2, and Person #1-3." Instead of creating the subclasses arbitrarily, time features may be used to classify the images based on their given time stamp. In some instances, the set of images may be reclustered into different subclasses as more and more images become available. The number of subclasses may also change as more images become available. In some instances, the number of subclasses may also be determined by an unsupervised learning method such as k-means clustering.

This similar method may be applied for all other types of image processing as applied in biometric identification and authentication. Using time may be the most convenient feature for subclass determination, since most physical changes such as wrinkles, etc. may develop over time. However, other features such as space may be used. For example, if a person moves to a place with more sun, their complexion may change due to exposure to the sun. These and other features are described further below.

Figure 1B:
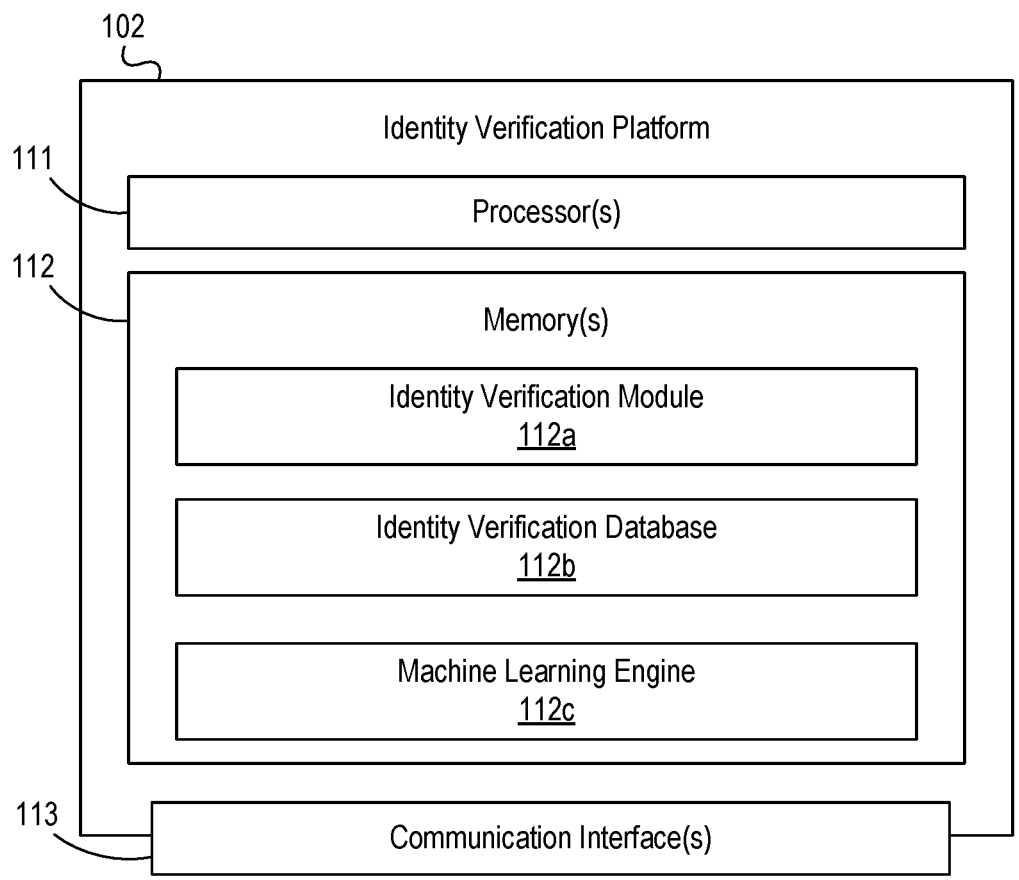

FIGS. 1A-1B depict an illustrative computing environment for performing enhanced identity verification in accordance with one or more example embodiments. Referring to FIG. 1A, computing environment 100 may include one or more computer systems. For example, computing environment 100 may include identity verification platform 102, information source system 103, and/or authentication device 104.

As described further below, identity verification platform 102 may be a computer system that includes one or more computing devices (e.g., servers, server blades, or the like) and/or other computer components (e.g., processors, memories, communication interfaces) that may be used to host a machine learning engine that may be used for identity verification as described further below. For example, the identity verification platform 102 may host a CNN that includes multiple subclasses to identify individuals based on images, video, and/or other biometric identifiers.

Information source system 103 may be a computer system that includes one or more computing devices (e.g., servers, server blades, or the like) and/or other computer components (e.g., processors, memories, communication interfaces) that may be used to store and/or otherwise host information that may be used to identify individuals (e.g., images, video, fingerprints, signature information, iris scan images, gait patterns, and/or other biometric information). In some instances, the information source system 103 may be configured to communicate with the identity verification platform 102 to provide information that may be used to train an identity verification model at the identity verification platform 102.

Authentication device 104 may be and/or otherwise include a laptop computer, desktop computer, mobile device, tablet, smartphone, camera, biometric sensor, fingerprint scanner, iris scanner, electronic signature pad, motion sensors, and/or other device that may be used by an individual to input or otherwise collect identifying information that may be used for identity verification and/or authentication. In some instances, authentication device 104 may be configured to display one or more user interfaces (e.g., authentication interfaces, or the like).

Computing environment 100 also may include one or more networks, which may interconnect identity verification platform 102, information source system 103, and/or authentication device 104. For example, computing environment 100 may include a network 101 (which may interconnect, e.g., identity verification platform 102, information source system 103, and/or authentication device 104).

In one or more arrangements, identity verification platform 102, information source system 103, and/or authentication device 104 may be any type of computing device capable of sending and/or receiving requests and processing the requests accordingly. For example, identity verification platform 102, information source system 103, and/or authentication device 104 and/or the other systems included in computing environment 100 may, in some instances, be and/or include server computers, desktop computers, laptop computers, tablet computers, smart phones, or the like that may include one or more processors, memories, communication interfaces, storage devices, and/or other components. As noted above, and as illustrated in greater detail below, any and/or all of identity verification platform 102, information source system 103, and/or authentication device 104 may, in some instances, be special-purpose computing devices configured to perform specific functions.

Referring to FIG. 1B, identity verification platform 102 may include one or more processors 111, memory 112, and communication interface 113. A data bus may interconnect processor 111, memory 112, and communication interface 113. Communication interface 113 may be a network interface configured to support communication between identity verification platform 102 and one or more networks (e.g., network 101, or the like). Memory 112 may include one or more program modules having instructions that when executed by processor 111 cause identity verification platform 102 to perform one or more functions described herein and/or one or more databases that may store and/or otherwise maintain information which may be used by such program modules and/or processor 111. In some instances, the one or more program modules and/or databases may be stored by and/or maintained in different memory units of identity verification platform 102 and/or by different computing devices that may form and/or otherwise make up identity verification platform 102. For example, memory 112 may have, host, store, and/or include identity verification module 112a, identity verification database 112b, and/or machine learning engine 112c.

Identity verification module 112a may have instructions that direct and/or cause identity verification module 112a to provide enhanced identity verification, as discussed in greater detail below. Identity verification database 112b may store information used by identity verification module 112a and/or identity verification platform 102 in application of advanced techniques to provide enhanced identity verification and/or in performing other functions. Machine learning engine 112c may be used to train, host, and/or otherwise iteratively refine one or more datasets, rulesets, and/or models that may be executed to perform identity verification.

Figure 2B:
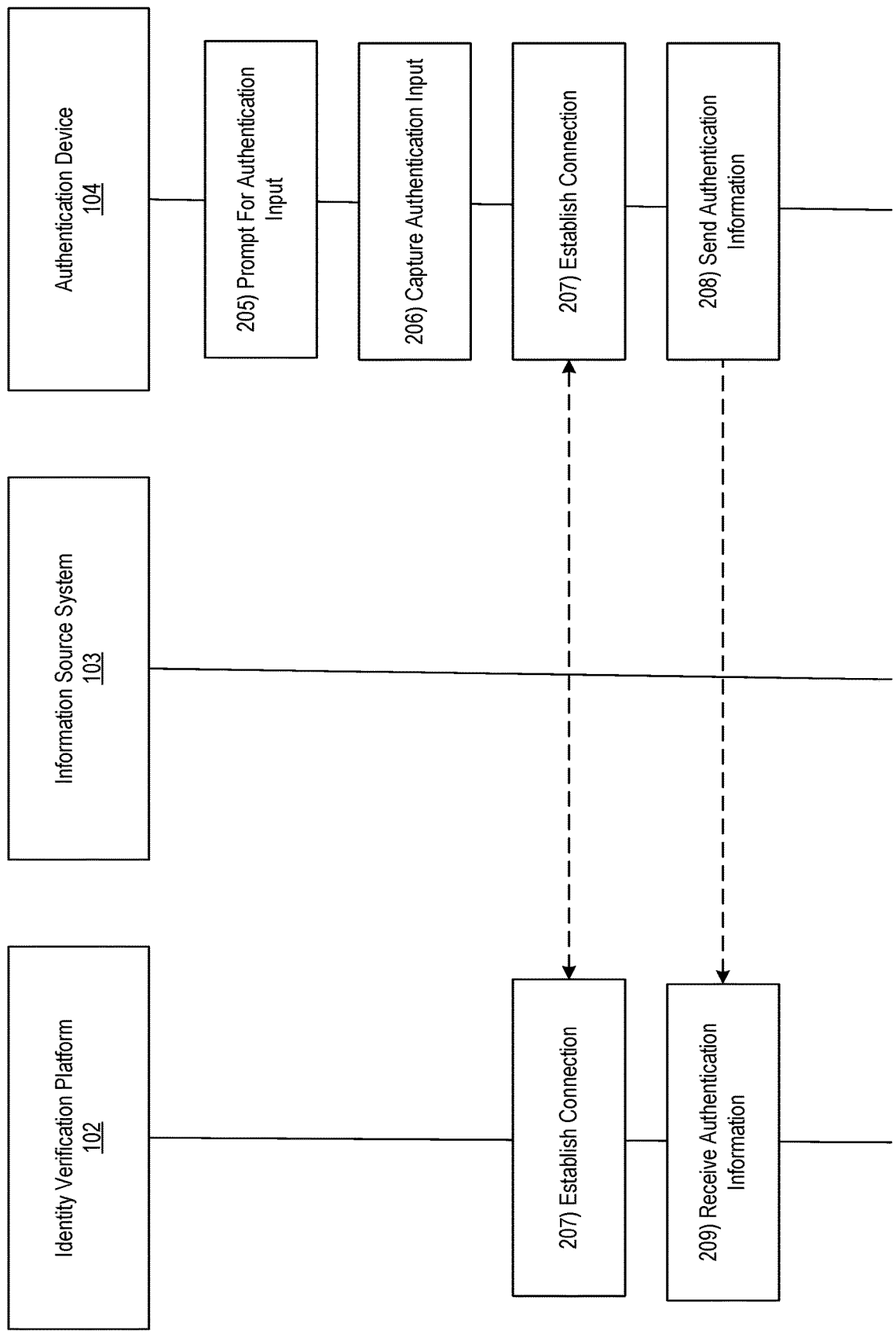
Figure 2C:
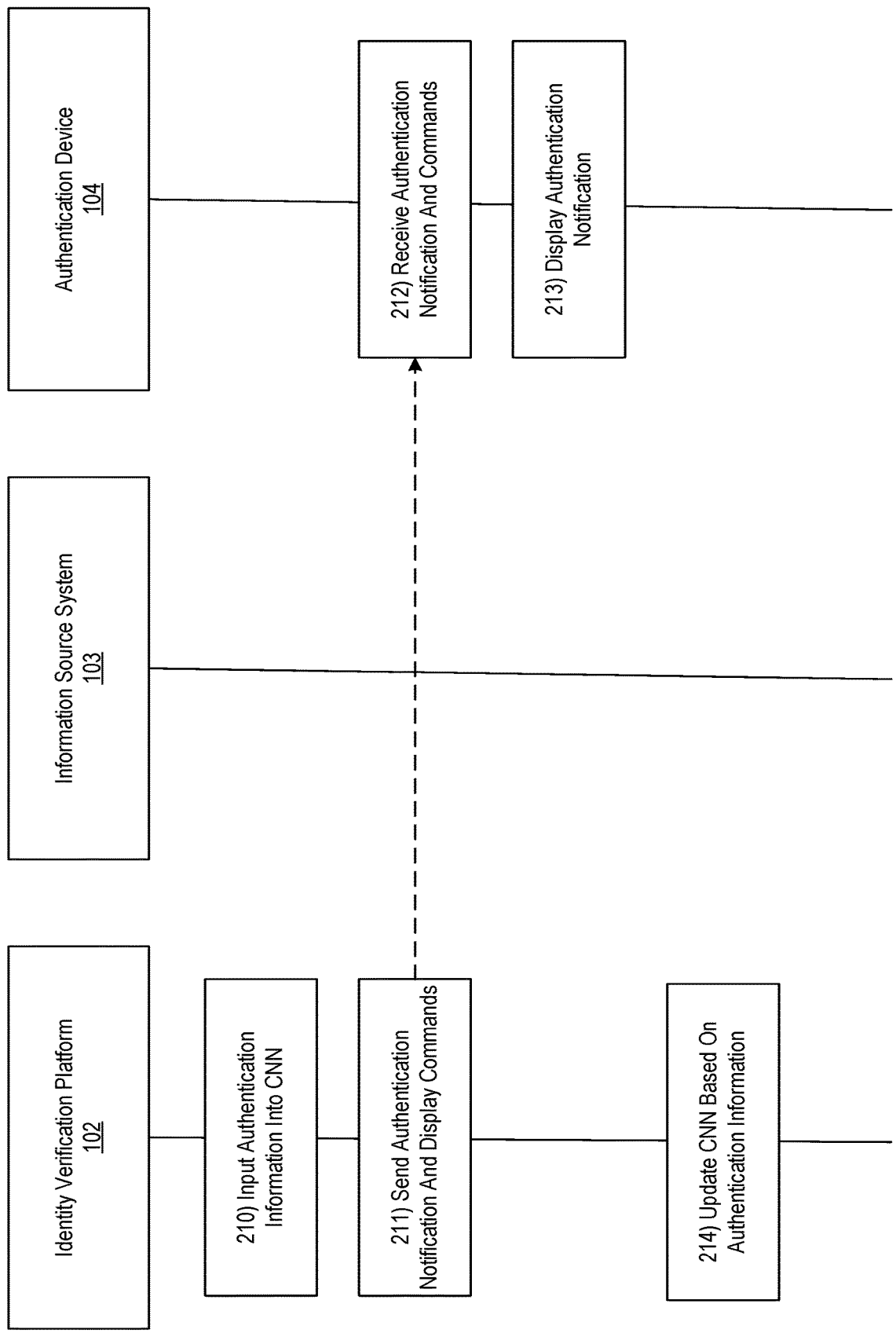

FIGS. 2A-2C depict an illustrative event sequence for performing enhanced identity verification in accordance with one or more example embodiments. Referring to FIG. 2A, at step 201, the identity verification platform 102 may establish a connection with the information source system 103. For example, the identity verification platform 102 may establish a first wired or wireless data connection with the information source system 103 to link the identity verification platform 102 with the information source system 103 (e.g., in preparation for retrieving historical information). In some instances, the identity verification platform 102 may identify whether or not a connection is already established with the information source system 103. If a connection is already established with the information source system 103, the identity verification platform 102 might not re-establish the connection. If a connection is not yet established with the information source system 103, the identity verification platform 102 may establish the first data connection as described herein.

At step 202, the identity verification platform 102 may retrieve historical identifying information from the information source system 103. For example, the identity verification platform 102 may retrieve the historical identifying information from the information source system 103 via the communication interface 113 and while the first data connection is established. In some instances, in retrieving the historical identifying information, the identity verification platform 102 may retrieve information for a plurality of different individuals, who may, e.g., have accounts or otherwise be granted access/authorization to a service provided by an enterprise organization corresponding to the identity verification platform 102. In some instances, in retrieving the historical identifying information, the identity verification platform 102 may retrieve (e.g., with permission of the user) facial images, signatures, fingerprints, videos depicting gait, other biometric information, and/or other images/video that may be used to identity individuals. In some instances, in retrieving the historical identifying information, the identity verification platform 102 may retrieve information corresponding to individuals during different periods of their lives, which may, e.g., be changing as time progresses (e.g., due to aging, physical injury, and/or otherwise).

At step 203, the identity verification platform 102 may train a machine learning model to perform identity verification using the historical identifying information retrieved at step 202. For example, the identity verification platform 102 may train a CNN.

With regard to the facial images, the identity verification platform 102 may convert the facial images from the spatial domain to the frequency domain, and may identify, for each image, a center of gravity. For example, the identity verification platform 102 may identify an average frequency value, maximum frequency value, median frequency value, and/or other value representative of each frequency domain image. Based on the identified centers of gravity, the identity verification platform 102 may establish one or more subclasses, each defined by a center of gravity/centroid range limited by a minimum center of gravity value and a maximum center of gravity value. In doing so, the identity verification platform 102 may group facial images with similar centers of gravity into the same subclasses, and may separate facial images with greater deviation into different subclasses. In some instances, the identity verification platform 102 may perform this training on a user by user basis so as to establish multiple subclasses for each authorized individual. For example, the identity verification platform 102 may perform a hybrid method that implements both supervised and unsupervised classification (e.g., data may be labelled with an identity and/or timestamp, but may then be clustered in an unsupervised manner based on the center of gravity values). In these instances, the identity verification platform 102 may sort the facial images into the subclasses based on timestamps corresponding to the facial images. For example, for a particular individual, the identity verification platform 102 may sort the facial images into three subclasses corresponding to the following time periods: 1990-2000, 2001-2015, 2016-present. In doing so, the identity verification platform 102 may account for changes in physical appearance to the authorized individuals over time (e.g., which might not otherwise be recognized).

In some instances, the identity verification platform 102 may further train the CNN, using similar techniques as described above with regard to the facial images, based on other received identifying information (e.g., signatures, fingerprints, videos depicting gait, other biometric information, and/or other images/video that may be used to identity individuals). For example, the identity verification platform 102 may have CNN models specific to each type of information, and for each model, may convert each corresponding piece of the identifying information to the frequency domain and sort it into one or more subclasses based on the center of gravity value (which may, e.g., establish subclasses corresponding to various time periods throughout the duration of the individuals lives during which the identifying data remained consistent).

In some instances, in training the CNN, the identity verification platform 102 may train the CNN to output an identity or an indication that the individual is authorized if that individual is successfully identified. Otherwise, the CNN may be trained to output an indication that the individual is not identified or otherwise authorized if the individual is not successfully identified.

At step 204, the authentication device 104 may receive an authentication request. For example, the authentication device 104 may receive a request via a display or other portion of the authentication device 104 requesting access to a service, physical premises, and/or otherwise.

Referring to FIG. 2B, at step 205, the authentication device 104 may prompt the requesting individual to provide an authentication input. For example, the authentication device 104 may prompt the requesting individual to provide a facial scan, signature, fingerprint, video depicting gait, other biometric information, and/or other images/video that may be used to identify the individual.

At step 206, the authentication device 104 may capture an authentication input corresponding to the individual (e.g., a facial scan, signature, fingerprint, video depicting gait, other biometric information, and/or other images/video that may be used to identify the individual). At step 207, the authentication device 104 may establish a connection with the identity verification platform 102. For example, the authentication device 104 may establish a second wired or wireless data connection with the identity verification platform 102 to link the authentication device 104 with the identity verification platform 102 (e.g., in preparation for sending authentication information). In some instances, the authentication device 104 may identify whether or not a connection is already established with the identity verification platform 102. If a connection is already established with the identity verification platform 102, the authentication device 104 might not re-establish the connection. If a connection is not yet established, the identity verification platform 102 may establish the second data connection as described herein.

At step 208, the authentication device 104 may send authentication information, based on the authentication input, to the identity verification platform 102. For example, the authentication device 104 may send the authentication information to the identity verification platform 102 while the second data connection is established.

At step 209, the identity verification platform 102 may receive the authentication information sent at step 208. For example, the identity verification platform 102 may receive the authentication information via the communication interface 113 and while the second data connection is established.

Referring to FIG. 2C, at step 210, the identity verification platform 102 may input the authentication information into the CNN. For example, the identity verification platform 102 may input a first facial scan image, received at step 209, into the CNN. In doing so, the identity verification platform 102 may convert the first facial scan image to the frequency domain and identify a center of gravity for the first facial scan. After identifying the center of gravity, the identity verification platform 102 may use the CNN to identify a corresponding subclass (e.g., based on the various center of gravity ranges for each subclass). Then, once a subclass has been developed, the identity verification platform 102 may use the CNN to identify the first individual.

Additionally or alternatively, the identity verification platform 102 may use the CNN to perform identity verification based on a signature, fingerprint, video depicting gait, other biometric information, and/or other images/video that may be used to identify the individual (e.g., using similar techniques as described above with regard to the first facial scan image). For example, the identity verification platform 102 may convert this authentication information to the frequency domain, identify a center of gravity for the authentication information, and use the CNN to identify a corresponding subclass (e.g., based on the various center of gravity ranges for each subclass). Then, once a subclass has been developed, the identity verification platform 102 may use the CNN to identify the first individual.

In some instances, the CNN may combine the analysis of various types of authentication information to perform identity verification. For example, the CNN may identify the first individual using multiple types of authentication information. In some instances, the identity verification platform 102 may analyze, using the CNN, any and/or all authentication information received from the authentication device 104 (e.g., to provide additional layers of identity verification).

At step 211, the identity verification platform 102 may send an authentication notification, indicating whether or not the requesting individual was verified, to the authentication device 104. For example, the identity verification platform 102 may send the authentication notification to the authentication device 104 via the communication interface 113 and while the second data connection is established. In some instances, the identity verification platform 102 may also send one or more commands directing the authentication device 104 to display the authentication notification.

At step 212, the authentication device 104 may receive the authentication notification sent at step 211. For example, the authentication device 104 may receive the authentication notification while the second data connection is established. In some instances, the authentication device 104 may also receive the one or more commands directing the authentication device 104 to display the authentication notification.

Figure 4:
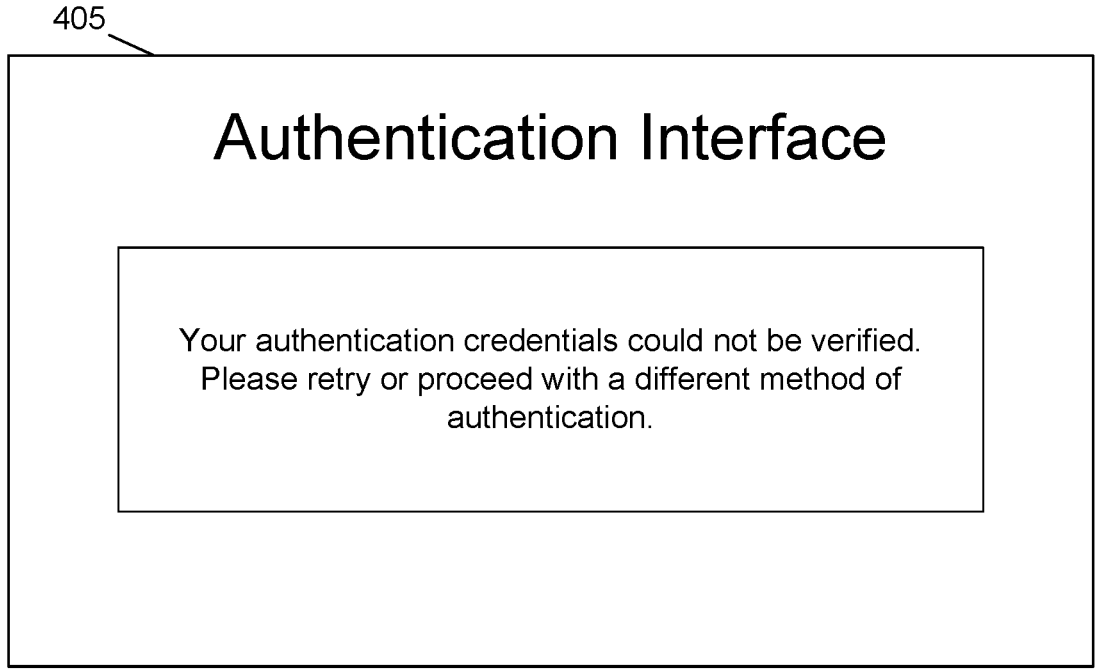
FIGS. 4 and 5 depict illustrative graphical user interfaces depicting the results of enhanced identity verification in accordance with one or more example embodiments.
Figure 5:
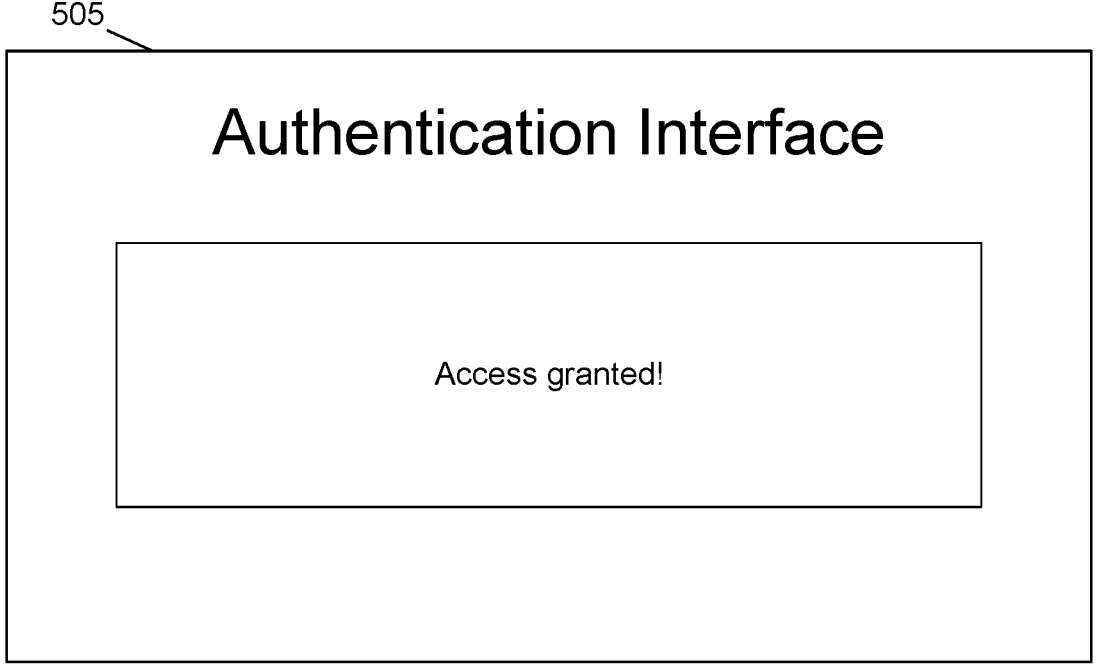

At step 213, based on or in response to the one or more commands directing the authentication device 104 to display the authentication notification, the authentication device 104 may display the authentication notification. For example, the authentication device 104 may display a graphical user interface similar to graphical user interface 405, which is shown in FIG. 4, and that indicates that the individual was not verified and authorization was not granted. Alternatively, the authentication device 104 may display a graphical user interface similar to graphical user interface similar to graphical user interface 505, which is shown in FIG. 5, and that indicates that the individual was verified and authorization is granted. Additionally or alternatively, in these instances, the authentication device 104 (and/or a server corresponding to a requested service) may grant electronic access to the requested service.

Although steps 211-213 describe sending an authentication notification and granting electronic access accordingly, physical access also may be granted using a similar method as described above. For example, the identity verification platform 102 may send one or more commands directing a premises access control system (e.g., a radio frequency identification (RFID) badge sensor, or other control system) to allow physical access to a premises, which may cause the premises access control system to allow physical access accordingly.

At step 214, the identity verification platform 102 may feed the authentication information back into the CNN so as to continuously and dynamically refine the CNN based on newly received information. For example, the identity verification platform 102 may establish a dynamic feedback loop that may add additional training information to the CNN. In some instances, in doing so, the identity verification platform 102 may add new subclasses and/or merge subclasses (e.g., based on the authentication information). For example, the identity verification platform 102 and/or CNN may identify that, based on the authentication information and it's corresponding center of gravity, a new class should be established for the individual because it falls outside of the center of gravity ranges for any established classes or because an amount of authentication information for an established subclass exceeds a class split threshold (e.g., indicating that a subclass could be further split to refine the subclasses based on an amount of information within an existing subclass). Additionally or alternatively, the identity verification platform 102 and/or CNN may identify that, based on the authentication information and it's corresponding center of gravity, one or more subclasses should be merged (e.g., because an amount of authentication information that exceeds a merge threshold falls within the center of gravity ranges for multiple established subclasses).

In some instances, the identity verification platform 102 may receive feedback information from the authentication device 104, and may update the CNN accordingly. For example, if the identity verification platform 102 received initial authentication information and was unable to verify the individual's identity, but then verified the individual's identity based on additionally received information, the identity verification platform 102 may update the CNN to include the initial authentication information as verified information for the individual. For example, a facial scan might not be recognized, but a fingerprint may be verified. In this example, the identity verification platform 102 may identify that its failure to initially verify the individual was in error, and may update the CNN to recognize the individual based on the corresponding facial scan going forward. In doing so, the identity verification platform 102 may continuously and dynamically refine the CNN so as to improve performance in identity verification.

Although steps 201-214 describe the primary use case of performing identity verification for authentication and authorization, the methods described above may be performed in any other use case without departing from the scope of the disclosure.

Figure 3:
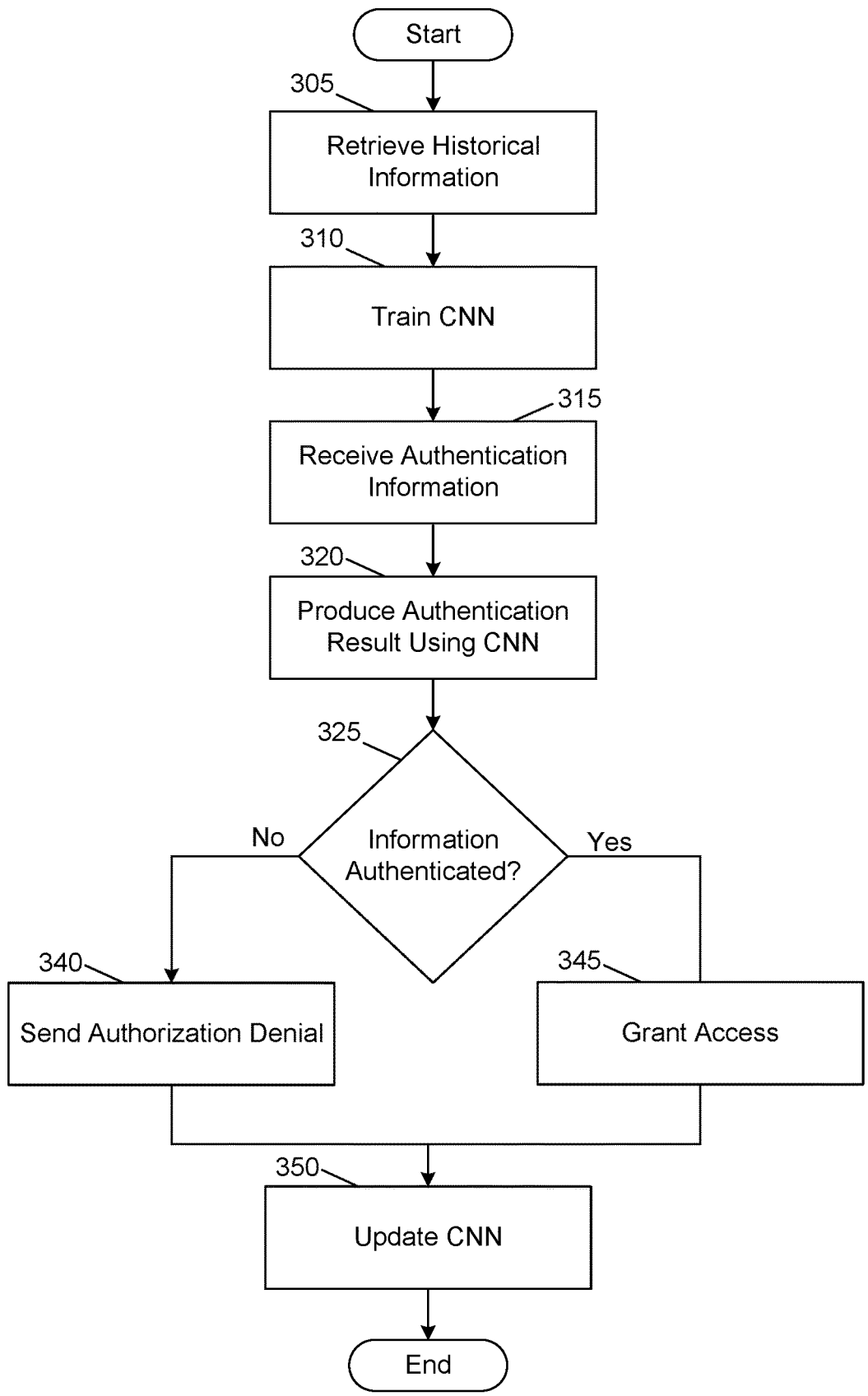
FIG. 3 depicts an illustrative method for performing enhanced identity verification in accordance with one or more example embodiments.

FIG. 3 depicts an illustrative method for enhanced identity verification in accordance with one or more example embodiments. Referring to FIG. 3, at step 305, a computing platform including one or more processors, memory, and a communication interface may retrieve historical information. At step 310, the computing platform may train a CNN using the historical information. At step 315, the computing platform may receive authentication information for an individual. At step 320, the computing platform may produce, using the CNN and based on the authentication information, an authentication result. At step 325, the computing platform may identify whether or not the authentication result indicates that the individual is authenticated. If the individual is not authenticated, the computing platform may proceed to step 340. If the individual is authenticated, the computing platform may proceed to step 345.

At step 340, the computing platform may send an authorization denial notification to a user device. At step 345, the computing platform may grant requested access to the individual. At step 350, the computing platform may update the CNN based on the authentication information and/or other feedback information.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A computing platform comprising:
    at least one processor;
    a communication interface communicatively coupled to the at least one processor; and
    memory storing computer-readable instructions that, when executed by the at least one processor, cause the computing platform to:
        receive a plurality of facial scans of an individual;
        train, using the plurality of facial scans, a convolutional neural network (CNN) to identify the individual based on a first facial scan of the individual, wherein training the CNN comprises:
            converting the plurality of facial scans to a frequency domain,
            identifying a center of gravity for each of the plurality of facial scans, and
            generating, based on distances between the centers of gravity, one or more subclasses for the plurality of facial scans, wherein each subclass is defined by a center of gravity range limited by a minimum center of gravity value and a maximum center of gravity value;
        receive an authorization request including the first facial scan of the individual;
        input the first facial scan into the CNN, wherein inputting the first facial scan into the CNN causes the CNN to:
            convert the first facial scan to the frequency domain,
            identify a center of gravity for the first facial scan,
            compare the center of gravity for the first facial scan to center of gravity ranges to identify a corresponding subclass, and
            identify, based on the corresponding subclass, the individual;
        based on successful identification of the individual, grant requested access to the individual; and
        update, using the first facial scan, the CNN.

2. The computing platform of claim 1, wherein the plurality of facial scans comprise images of the individual throughout a lifetime of the individual.

3. The computing platform of claim 1, wherein training the CNN further comprises training the CNN based on a plurality of fingerprint patterns of the individual, and wherein training the CNN comprises:
    converting the plurality of fingerprint patterns to the frequency domain,
    identifying a center of gravity for each of the plurality of fingerprint patterns, and
    generating, based on distances between the centers of gravity of the plurality of fingerprint patterns, one or more subclasses for the plurality of fingerprint patterns.

4. The computing platform of claim 3, wherein the memory stores additional computer-readable instructions that, when executed by the at least one processor, cause the computing platform to:
    receive a first fingerprint pattern;
    input the first fingerprint pattern into the CNN, wherein inputting the first fingerprint pattern into the CNN causes the CNN to:
        convert the first fingerprint pattern to the frequency domain;
        identify a center of gravity for the first fingerprint pattern;
        identify, based on the center of gravity for the first fingerprint pattern, a corresponding fingerprint pattern subclass; and
        identify, based on the corresponding fingerprint pattern subclass, the individual.

5. The computing platform of claim 1, wherein training the CNN further comprises training the CNN based on a plurality of iris images of the individual, and wherein training the CNN comprises:
    converting the plurality of iris images to the frequency domain,
    identifying a center of gravity for each of the plurality of iris images, and
    generating, based on distances between the centers of gravity of the plurality of iris images, one or more subclasses for the plurality of iris images.

6. The computing platform of claim 5, wherein the memory stores additional computer-readable instructions that, when executed by the at least one processor, cause the computing platform to:
    receive a first iris image;
    input the first iris image into the CNN, wherein inputting the first iris image into the CNN causes the CNN to:
        convert the first iris image to the frequency domain;
        identify a center of gravity for the first iris image;
        identify, based on the center of gravity for the first iris image, a corresponding iris subclass; and
        identify, based on the corresponding iris subclass, the individual.

7. The computing platform of claim 1, wherein training the CNN further comprises training the CNN based on a plurality of gait images of the individual, and wherein training the CNN comprises:
    converting the plurality of gait images to the frequency domain, identifying a center of gravity for each of the plurality of gait images, and generating, based on distances between the centers of gravity of the plurality of gait images, one or more subclasses for the plurality of gait images.

8. The computing platform of claim 7, wherein the memory stores additional computer-readable instructions that, when executed by the at least one processor, cause the computing platform to:

receive a first gait image; and input the first gait image into the CNN, wherein inputting the first gait image into the CNN causes the CNN to:
convert the first gait image to the frequency domain,
identify a center of gravity for the first gait image,
identify, based on the center of gravity for the first gait image, a corresponding gait subclass, and
identify, based on the corresponding gait subclass, the individual.

9. The computing platform of claim 1, wherein identifying the individual further comprises identifying, based on analysis of additional biometric information using the CNN, the individual.

10. The computing platform of claim 1, wherein updating the CNN comprises one or more of:

adding a new subclass based on the center of gravity for the first facial scan, or merging the subclasses based on the center of gravity for the first facial scan.

11. A method comprising:

at a computing platform comprising at least one processor, a communication interface, and memory:
receiving a plurality of facial scans of an individual;
training, using the plurality of facial scans, a convolutional neural network (CNN) to identify the individual based on a first facial scan of the individual, wherein training the CNN comprises:
converting the plurality of facial scans to a frequency domain,
identifying a center of gravity for each of the plurality of facial scans, and
generating, based on distances between the centers of gravity, one or more subclasses for the plurality of facial scans, wherein each subclass is defined by a center of gravity range limited by a minimum center of gravity value and a maximum center of gravity value;
receiving an authorization request including the first facial scan of the individual;
inputting the first facial scan into the CNN, wherein inputting the first facial scan into the CNN causes the CNN to:
converting the first facial scan to the frequency domain,
identifying a center of gravity for the first facial scan,
comparing the center of gravity for the first facial scan to center of gravity ranges to identify a corresponding subclass, and
identifying, based on the corresponding subclass, the individual;
based on successful identification of the individual, granting requested access to the individual; and
updating, using the first facial scan, the CNN.

12. The method of claim 11, wherein the plurality of facial scans comprise images of the individual throughout a lifetime of the individual.

13. The method of claim 11, wherein training the CNN further comprises training the CNN based on a plurality of fingerprint patterns of the individual, and wherein training the CNN comprises:

converting the plurality of fingerprint patterns to the frequency domain, identifying a center of gravity for each of the plurality of fingerprint patterns, and generating, based on distances between the centers of gravity of the plurality of fingerprint patterns, one or more subclasses for the plurality of fingerprint patterns.

14. The method of claim 13, further comprising:

receiving a first fingerprint pattern;

inputting the first fingerprint pattern into the CNN, wherein inputting the first fingerprint pattern into the CNN causes the CNN to:
convert the first fingerprint pattern to the frequency domain;
identify a center of gravity for the first fingerprint pattern;
identify, based on the center of gravity for the first fingerprint pattern, a corresponding fingerprint pattern subclass; and
identify, based on the corresponding fingerprint pattern subclass, the individual.

15. The method of claim 11, wherein training the CNN further comprises training the CNN based on a plurality of iris images of the individual, and wherein training the CNN comprises:

converting the plurality of iris images to the frequency domain, identifying a center of gravity for each of the plurality of iris images, and generating, based on distances between the centers of gravity of the plurality of iris images, one or more subclasses for the plurality of iris images.

16. The method of claim 15, further comprising:

receiving a first iris image;

inputting the first iris image into the CNN, wherein inputting the first iris image into the CNN causes the CNN to:
convert the first iris image to the frequency domain;
identify a center of gravity for the first iris image;
identify, based on the center of gravity for the first iris image, a corresponding iris subclass; and
identify, based on the corresponding iris subclass, the individual.

17. The method of claim 11, wherein training the CNN further comprises training the CNN based on a plurality of gait images of the individual, and wherein training the CNN comprises:

converting the plurality of gait images to the frequency domain, identifying a center of gravity for each of the plurality of gait images, and generating, based on distances between the centers of gravity of the plurality of gait images, one or more subclasses for the plurality of gait images.

18. The method of claim 17, further comprising:

receiving a first gait image; and inputting the first gait image into the CNN, wherein inputting the first gait image into the CNN causes the CNN to:
convert the first gait image to the frequency domain,
identify a center of gravity for the first gait image,
identify, based on the center of gravity for the first gait image, a corresponding gait subclass, and identify, based on the corresponding gait subclass, the individual.

19. The method of claim 11, wherein identifying the individual further comprises identifying, based on analysis of additional biometric information using the CNN, the individual.

20. One or more non-transitory computer-readable media storing instructions that, when executed by a computing platform comprising at least one processor, a communication interface, and memory, cause the computing platform to:
- receive a plurality of facial scans of an individual;
- train, using the plurality of facial scans, a convolutional neural network (CNN) to identify the individual based on a first facial scan of the individual, wherein training the CNN comprises:
  - converting the plurality of facial scans to a frequency domain,
  - identifying a center of gravity for each of the plurality of facial scans, and
  - generating, based on distances between the centers of gravity, one or more subclasses for the plurality of facial scans, wherein each subclass is defined by a center of gravity range limited by a minimum center of gravity value and a maximum center of gravity value;
- receive an authorization request including the first facial scan of the individual;
- input the first facial scan into the CNN, wherein inputting the first facial scan into the CNN causes the CNN to:
  - convert the first facial scan to the frequency domain,
  - identify a center of gravity for the first facial scan,
  - compare the center of gravity for the first facial scan to center of gravity ranges to identify a corresponding subclass, and
  - identify, based on the corresponding subclass, the individual;
- based on successful identification of the individual, grant requested access to the individual; and
- update, using the first facial scan, the CNN.

\* \* \* \* \*